United States Patent

[15] 3,677,027

Granryd

[45] July 18, 1972

[54] INTERNAL COMBUSTION HEAT ENGINE AND PROCESS

[72] Inventor: Eric G. U. Granryd, Viggbyholm, Sweden
[73] Assignee: American Gas Association
[22] Filed: Nov. 23, 1970
[21] Appl. No.: 91,833

[52] U.S. Cl. ................................62/115, 60/24, 123/1 R, 123/18 R, 123/122 R
[51] Int. Cl. ......................F25b 1/00, F03g 7/06, F02b 1/00
[58] Field of Search .................60/24; 62/115; 123/18, 18 A, 123/122 R

[56] References Cited

UNITED STATES PATENTS

| | | |
|---|---|---|
| 155,087 | 9/1874 | Hirsch ........................................60/24 |
| 389,045 | 9/1884 | Bair ............................................60/24 |
| 3,426,525 | 2/1969 | Rubin .........................................60/24 |
| 3,477,226 | 11/1969 | Percival .....................................60/24 |
| 3,488,945 | 1/1970 | Kelly...........................................60/24 |

Primary Examiner—Wendell E. Burns
Attorney—Alexander and Speckman

[57] ABSTRACT

A process for conversion of chemical energy to mechanical energy by heating air within a substantially gastight gas chamber by passage in heat-exchange relation with a heat-regenerative means, within the chamber, substantially continuous burning of an injected combustible fluid fuel during injection thereof resulting in substantial increase in the average temperature-pressure relation of the gas within the gas chamber, expanding said gas chamber by movement of a pressure responsive member, and heating the heat-regenerative means by passage of the combustion product gas in heat-exchange relation with the heat-regenerative means. An internal combustion heat engine having a heat-regenerative means within a generally cylindrical, substantially gastight gas chamber defined by a casing, and semi-arcuate oscillatory displacer to displace enclosed gases in heat-exchange relation with the heat-regenerative means, air intake conduit, exhaust conduit, fuel injection means, an ignition means and a pressure responsive member. A gas cooling system wherein a compression means is actuated by movement of the pressure responsive member of the internal combustion heat engine.

18 Claims, 13 Drawing Figures

PATENTED JUL 18 1972

INVENTOR:
ERIC G. U. GRANRYD
BY
Alexander Speckman
ATT'YS

FIG. 7
FIG. 8
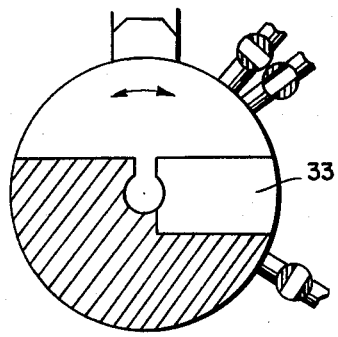
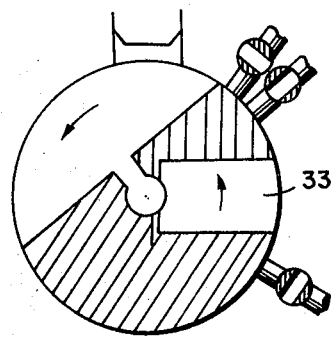
FIG. 9
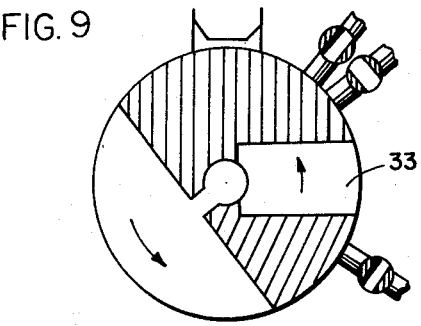
FIG. 10
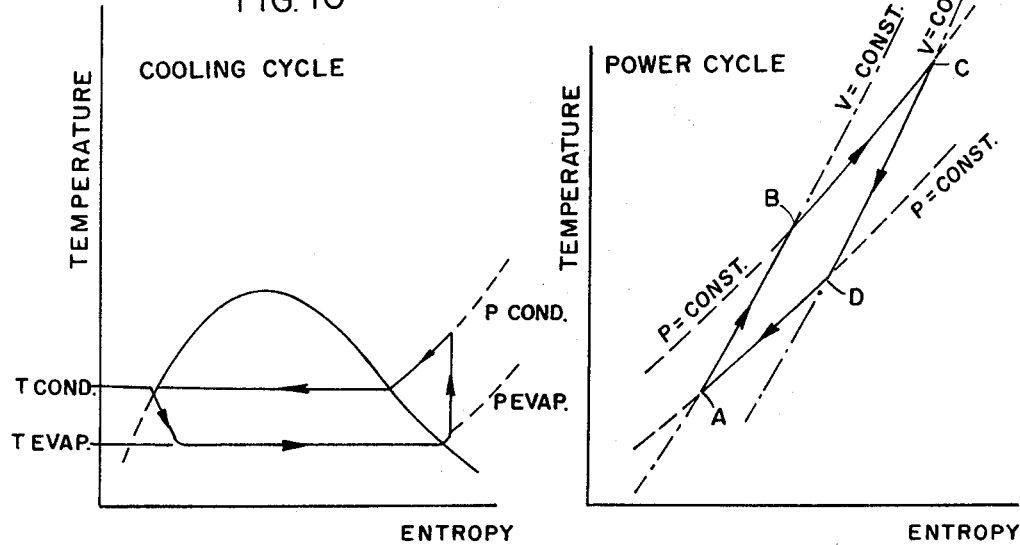
INVENTOR:
ERIC G. U. GRANRYD
BY
Alexander G. Beckman
ATT'YS

PATENTED JUL 18 1972 3,677,027

INVENTOR:
ERIC G. U. GRANRYD
BY
Alexander & Speckman
ATT'YS

INTERNAL COMBUSTION HEAT ENGINE AND PROCESS

Heretofore heat engines have used external burners to heat gases. Two such heat engines are described in U.S. Pat. Nos. 2,894,368 and 1,675,829. Other heat engines have made use of other types of external heat sources. In particular attention is drawn to my U.S. Pat. No. 3,474,641 wherein heat is provided by a heating means such as a tube bundle heater containing hot fluid or a burning fuel such as natural gas.

I have discovered a new and efficient process, a process of internal combustion, for providing heat for a heat engine. Oxidation of a combustible fluid fuel injected into a closed volume will cause an increase in the average temperature-pressure relation of the gas within said closed volume. The heat energy produced during a period of continuous combustion may be stored in a heat-regenerative means within said closed volume and may be used to heat fresh air thereby raising the temperature-pressure relation such that another period of continuous combustion may readily occur. The heat-regenerative means, after said period of combustion, will aid in lowering the temperature, and hence the temperature-pressure relation, of the enclosed gas. The difference in pressures may be harnessed by use of a wide variety of pressure responsive members to produce readily usable mechanical energy.

A generally cylindrical gas chamber defined by a casing and containing a heat-regenerative means and a semiarcuate oscillatory displacer for displacement of an enclosed gas in heat-exchange relation with the heat-regenerative means can be used as a chamber for the burning of a combustible fluid fuel. The heat-regenerative means may be alternately used to cool the gases heated by combustion and to heat fresh air for later support of combustion by the displacement of relatively hot and relatively cool gas therethrough. Various pressure responsive members may be made a part of the casing of this device to harness the pressure changes for mechanical work.

The internal combustion heat engine of my invention may be used efficiently to actuate a compressor used in a cooling apparatus. The refrigerant of the cooling apparatus will remain in a closed system, and will not enter the gas chamber of the internal combustion heat engine of this invention.

Heretofore, some internal combustion engines have injected a fuel into a combustion chamber before conditions would allow combustion. For example, the common 4-stroke cycle used in automobile engines injects a gas, thereafter compresses it and ignites an explosion with a spark. The injection of gas is complete before ignition occurs. The internal combustion engine of my invention, on the other hand, provides substantially continuous burning of fuel during the period said fuel is being injected. The combustion is continuous, not an explosion, and occurs as the fuel is being injected. Further, internal combustion engines of the prior art have required a high degree of torque because of the mechanical compression of the fuel and air before combustion. Both diesel engines and the common 4-stroke cycle engines depend on mechanical compression to create conditions suitable for combustion. The high degree of torque required has resulted in starting problems. The internal combustion engine of my invention requires significantly less torque because it is not necessary to provide mechanical compression. The same thermodynamic result is achieved by replacing the necessity for mechanical compression by regeneration of heat stored in a heat-regenerative means, rather then by use of mechanical energy stored in a fly wheel as is common in the prior art.

Many internal combustion engines of the prior art use spark plugs to ignite the mixture of fuel and air. The use of spark plugs created the problem of timing the spark plug such that it sparked at the proper point in the cycle. Faulty timing resulted in improper firing or failure thereof. In the internal combustion engine of my invention a continuous period of combustion is used. No timed spark plug is required. An ignition means, such as a glow plug or hot coil, serves to ignite the fuel. Therefore, there are no associated problems of timing a spark. Furthermore, the ignition means may only be necessary during the start-up period, since enough heat is regenerated to ignite the fuel spontaneously.

Internal combustion engines of the prior art are exposed to explosion and the consequent rapid extreme pressure variation. The internal combustion engine of my invention undergoes a period of continuous combustion, and need not withstand an explosion. In addition, no valve of my internal combustion engine is exposed to hot gases as is common in the prior art. The valves of my internal combustion engine may provide access to the "cold" volume of the gas chamber. Another significant advantage of the internal combustion engine of my invention is the relatively low noise level which results from its operation in comparison with the noise level of the internal combustion engine of the prior art. The reduced noise level is because the combustion of my internal combustion engine is continuous and not explosive and because heat-regeneration does not require mechanical compression.

Mechanical energy is derived from the process and from the engine of my invention by harnessing the large pressure change occurring within the gas chamber by a wide variety of pressure responsive members.

It is an object of my invention to provide a heat engine having a completely internal heat source.

It is a further object of my invention to provide a heat engine which utilizes internal combustion as a heat source.

Yet another object of my invention is to provide an efficient internal combustion heat engine wherein heat of combustion is preserved in a heat-regenerative means for use in creating pressure-temperature conditions necessary for combustion in subsequent cycles.

It is still another object of my invention to provide such an internal combustion heat engine for use as a prime mover.

A further object of my invention is to provide an internal combustion engine wherein the combustion occurs as the fuel is injected into the combustion chamber.

Another object of my invention is to provide an internal combustion engine wherein combustion occurs substantially continuously during fuel injection.

A further object of my invention is to provide an internal combustion engine having no timing problems associated with spark plugs of internal combustion engines of the prior art.

Still another object of my invention is to provide an internal combustion engine having no valves exposed to the hottest gases of combustion.

Another object of my invention is to provide an internal combustion engine having less noise than internal combustion engines of the prior art.

Yet another object of my invention is to provide an internal combustion heat engine having a diaphragm as a pressure responsive member.

A still further object of my invention is to provide a cooling apparatus comprising an internal combustion heat engine which compresses a refrigerant in a system separate from the internal combustion engine.

These and other important objects will become apparent from the following description and from the drawings showing preferred embodiments wherein.

Figure 11:
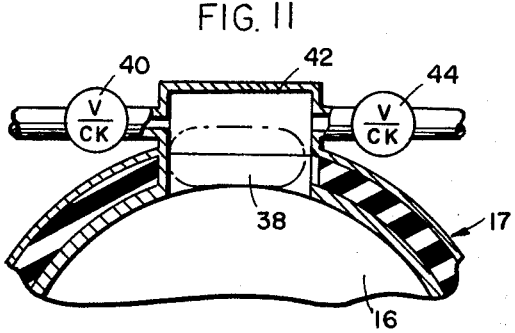
Figure 12:
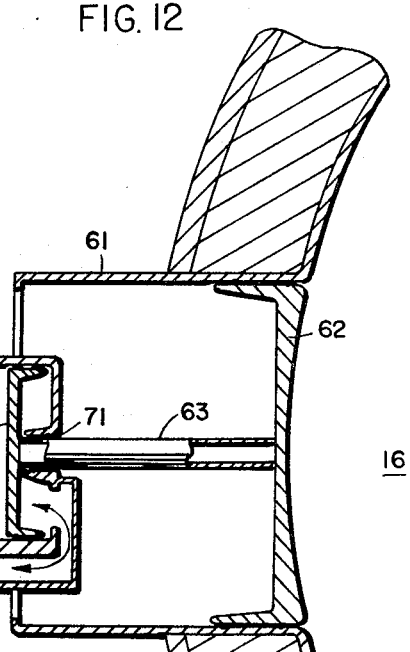

FIGS. 3 through 9 inclusive schematically illustrate the operating principles of the novel internal combustion heat engine of this invention;

FIG. 10 is a graph illustrating the thermal energy properties of the cooling apparatus of this invention;

FIG. 11 is a specific embodiment showing use of the internal combustion heat engine of this invention as a pump for a fluid system;

FIG. 12 is a schematic cross section of a piston arrangement specifically intended as a compressor.

Figure 13:
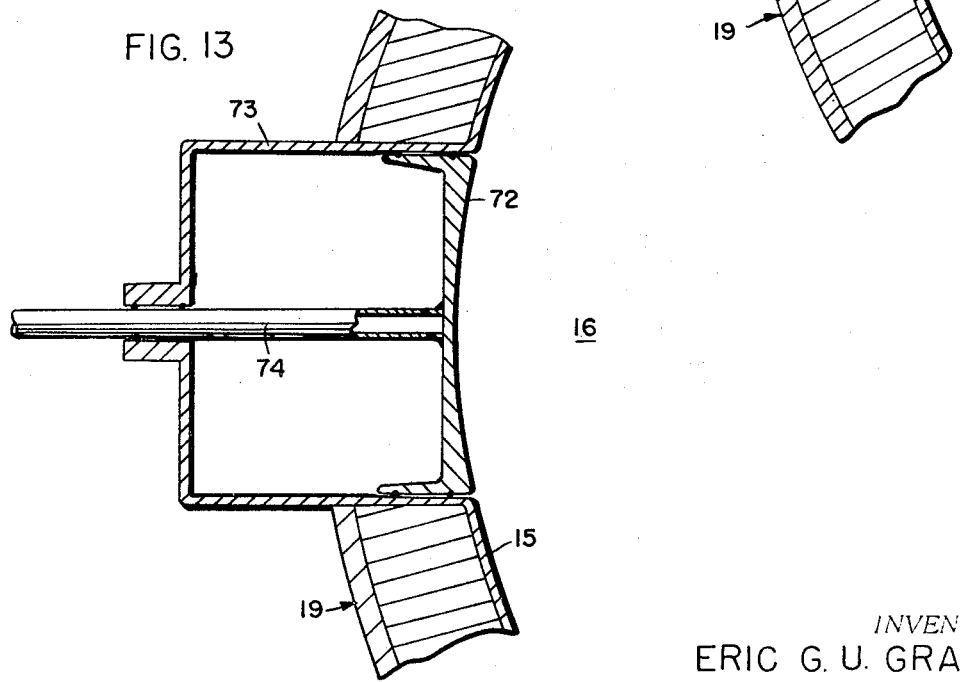

FIG. 13 is a schematic cross section of a piston device, another specific embodiment showing use of the internal combustion heat engine of this invention as a prime mover.

Figure 1:
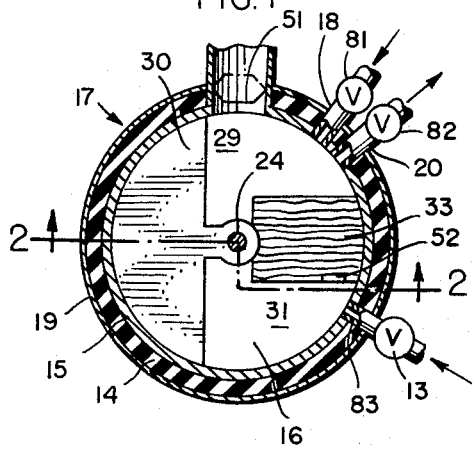
FIG. 1 is a plan view in cross section of the internal combustion engine of my invention.
Figure 2:
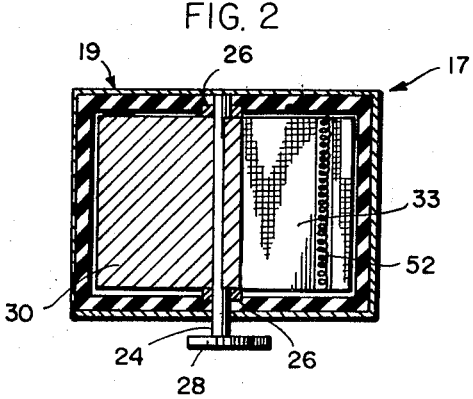
FIG. 2 is a side sectional view of the internal combustion engine of FIG. 1 as shown in FIG. 1.

Referring specifically to FIGS. 1 and 2, the components of this internal combustion engine of this invention are shown as engine 17, outer shell casing 19, insulation 14 and inner shell casing 15 defining gas chamber 16 which is generally cylindrical in shape. Communicating from chamber 16 to external reservoirs are valved conduits, namely, air intake conduit 18 allowing only for the flow of air into chamber 16, and exhaust conduit 20 allowing only for the flow of exhaust gas from chamber 16. Air intake conduit 18 is equipped with valve 81 and exhaust conduit 20 is equipped with valve 82. These valves are operated by linkage to shaft 24, or in some other way such that their operation is keyed to the movement of displacer 30. Valve 20 may also be a regular check valve allowing inlet of air when pressure inside the chamber is below ambient pressure. Fuel injection means 13 provides communication from an external fuel supply reservoir to gas chamber 16. Fuel injection means 13 is equipped with carburetion means 83 which may be used to atomize the fuel if a liquid fuel is being used.

Shaft 24 is disposed through chamber 16 and is retained in suitable workable relationship by bearing means 26. Shaft 24 penetrates inner shell casing 15 in fluid-tight relationship and is connected through suitable linkage means 28 to a power source which causes shaft 24 to undergo an oscillating movement. Secured to shaft 24 is displacer 30 which is semi-arcuate in configuration and congruent with inner shell casing 15. Displacer 30 divides chamber 16 into substantially two volumes, a first or "cold" volume 29 and a second or "hot" volume 31. Displacer 30 is constructed such that fluid passage through intake conduit 18, exhaust conduit 20 and fuel injection means 13 is not inhibited. To furnish thermal isolation of cold volume 29 from hot volume 31, displacer 30, insulation 14 and inner casing 15 may be constructed from thermal insulating materials. Casing 15 should specifically be designed in such a fashion that tangential heat conduction is minimal. Many suitable materials, such as ceramics or fused silica glass are well known in the art, and may be used for displacer 30 and insulation 14.

Positioned within gas chamber 16 from inner shell casing 15 toward the center of chamber 16 from inner shell casing 15 toward the center of chamber 16 and extending substantially the entire length of chamber 16 separating cold volume 29 from hot volume 31 is heat-regenerative means 33. The heat-regenerative means is constructed of materials having suitable thermal properties such as stainless steel, Hastalloy, or ceramics. The heat-regenerative means is designed to have maximal frontal area consistent with suitable thermal exchange properties to minimize the pressure drop of gas by movement through said heat-regenerative means. It is also desired to have minimal dead gas volume contained within said heat-regenerative means. Heat-regenerative means 33 is constructed for thermal storage and is preferably flat or corrugated stainless steel wire cloth or fine wire mesh arranged in successive layers with no thermal contact between layers. Such a configuration provides for a substantial thermal gradient in the heat-regenerative means while creating only small dead gas volume therein.

Briefly, operation of internal combustion engine 17 is achieved by oscillation of displacer 30 which is coordinated with operation of fuel injection means 13 and valves 81 and 82. Displacer 30 moves air from cold volume 29 through heat-regenerative means 33 into hot volume 31 achieving an average higher temperature-pressure relation. A fluid fuel is injected into hot volume 31 by fuel injection means 13 and substantially continuous burning occurs during the period of fuel injection. The burning begins by virtue of either an ignition means or the pressure-temperature conditions in hot volume 31. Such combustion substantially increases the average temperature-pressure relation to a high point and expansion of gas chamber 16 by depression of pressure responsive member 51, which is a part of inner shell casing 15, provides useful mechanical energy to the outside. The high pressure thereafter also causes a portion of the enclosed gas to exit gas chamber 16 through exhaust conduit 20, valve 82 having been operated by linkage with the displacer movement, thereby lowering the average pressure-temperature relation of the enclosed gas. The pressure-temperature relation is further lowered as displacer 30 moves the hot combustion product gas from hot volume 31 through relatively cool heat-regenerative means 33 into cold volume 29. As the average pressure is lowered to a point below that of the external fresh air reservoir and air intake conduit 18 opens as valve 81 operates by means of linkage with the displacer movement, or responds to the pressure difference, air intake conduit 18 will admit fresh air so that the cycle may be repeated.

The pressures in the external reservoirs connected to gas chamber 16 by air intake conduit 18 and exhaust conduit 20 may vary over wide ranges. The external pressures may be such that the lowest pressure in gas chamber 16 is lower than the pressure in the external reservoir connected by air intake conduit 18, and the highest pressure in gas chamber 16 is higher than the pressure in the external reservoir connected by exhaust conduit 20. Normally, the external reservoirs connected by air intake conduit 18 and exhaust conduit 20 will be the atmosphere, but other reservoirs may be used.

The pressures in volumes 29 and 31 remain about equal except for the preferably minor pressure drop through heat-regenerative means 33. Due to the small pressure drop in heat-regenerative means 33, a very small power input is required to oscillate displacer 30 and operate the valves and fluid fuel injection means 13. In fact, in use, the energy input required for displacer oscillation is insignificant when compared to the total energy input to the internal combustion heat engine, the major energy input being the potential energy of combustion attributable to the fuel and oxygen. Typically, after initiation of oscillation by an external power means, the oscillation of displacer 30 and operation of the valves and fluid fuel injection means will be by suitable linkage with pressure responsive member 51. Valves 81 and 82 and fluid injection means 13 may be operated by direct linkage to pressure responsive member 51 or indirectly through shaft 24. The total energy input requirement of the internal combustion heat engine of this invention is minimized by use of heat-regenerative means 33 which is known to be extremely efficient in takeup, storage, and release of thermal energy. A high temperature ratio between hot volume 31 and cold volume 29 is desirable.

For more detailed description of the operation of the internal combustion heat engine of this invention, reference is made to FIGS. 3 to 9 showing a device according to this invention having a flexible membrane as pressure responsive member 51, as also shown in FIG. 1, for harnessing the pressure change to obtain useful mechanical energy. In FIGS. 3 to 9, the arrows indicate direction of gas flow through heat-regenerative means 33 and the direction of displacer movement. Vertical lines indicate the volume of gas in cold volume 29 and the angular cross hatched section indicates the volume of gas in hot volume 31. When average temperatures are referred to they are the mass average absolute temperatures of all enclosed gas in the internal combustion heat engine, including gas within the heat-regenerative means. The passage or non-passage of intake air, exhaust gas and fuel are pictorially indicated.

Figure 3:
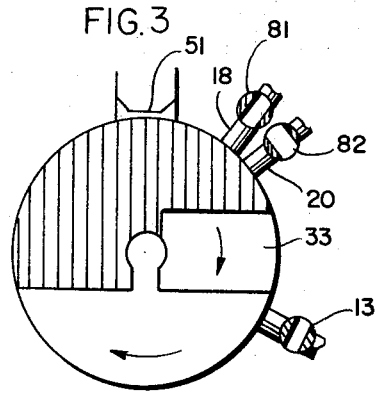

Referring to FIGS. 3 to 9, the sequential steps of the process of my invention are illustrated. Referring specifically to FIG. 3, the maximum amount of gas is contained in cold volume 29 at a slightly lower pressure than the pressure of the external reservoir connected to chamber 16 by air intake conduit 18. Due to this pressure difference, air or other combustion-supportable gas passes into gas chamber 16 through air intake conduit 18, valve 81 having been opened. Note that exhaust conduit 20 and fuel injection means 13 are closed. Pressure responsive member 51 is in an inward position. Displacer 30, actuated by an independent power source or by linkage with pressure responsive member 51, moves in the clockwise direction forcing passage of the enclosed gas through heat-regenerative means 33, which is relatively hot from operation of the prior cycle. The temperature of the gas moving in a clockwise direction through heat-regenerative means 33 is raised. The mass average temperature of the enclosed gas is also raised.

Figure 4:
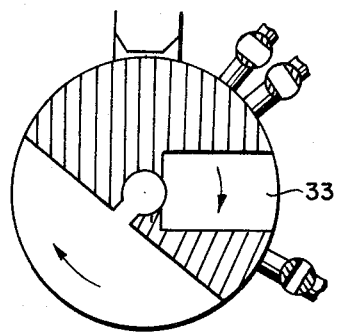
Figure 5:
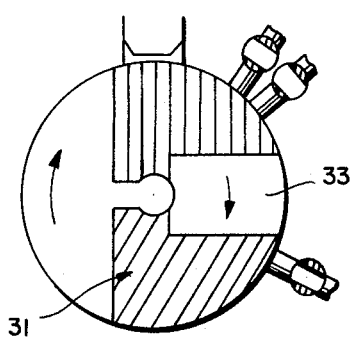

In FIG. 4, partial movement of displacer 30 is shown and the concomitant heating of the enclosed gas causes an increase in pressure of the enclosed gas such that it surpasses the pressure in the external reservoir which is connected to gas chamber 16 by air intake conduit 18, and the gas flow into chamber 16 from conduit 18 stops, valve 81 closing. Displacer 30 continues clockwise movement, as shown in FIG. 5, thereby moving more gas through heat-regenerative means 33 raising the mass average temperature and pressure. Fuel injection means 13 is opened by timed mechanical means not shown, typically, linkage as described earlier, at a point in the cycle at a time about as shown in FIG. 4 or FIG. 5 injecting a fuel into hot volume and injection of combustible fluid fuel will occur. Upon the start of the fuel injection period, the fuel stream will be ignited either by virtue of the existing temperature conditions in hot volume 31 or with the aid of ignition means 52. Ignition means 52 may be a spark device, glow plug or any other device suitable to ignite the injected fuel for a continuous burn during injection. A small hot electrical coil or a glow plug is preferred to avoid timing problems associated with spark plugs. The ignition means is operated by an outside means not shown. Typically, the ignition means would be connected to a battery. The ignition means will be placed in a position enabling ignition of the fuel being injected. The ignition means is intended only as an ignition device and is not intended to heat hot volume 31. The necessity for an ignition means diminishes as heat-regenerative means 33 serves to create conditions suitable for combustion, and in many instances the ignition means may be turned off entirely after the engine has warmed up.

Figure 6:
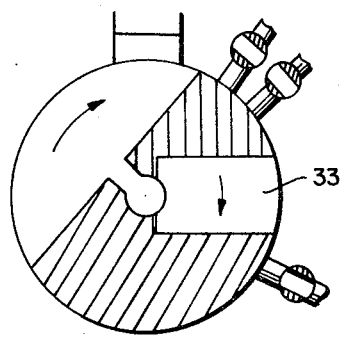

When the period of continuous combustion has begun the temperature of the enclosed gas will rapidly increase as well as the mass average temperature and pressure. As a certain pressure is reached and surpassed, gas chamber 16 will expand as pressure responsive means 51 is depressed, as shown in FIG. 6, thereby permitting mechanical energy to be transmitted from the internal combustion engine. The combustion continues as the injection of fuel continues. Note that both air intake conduit 18 and exhaust conduit 20 are closed. Displacer 30, as mentioned earlier, may be actuated by an independent power source and in any case is not moved directly by virtue of the combustion and consequent increase in pressure. The pressures in cold volume 29 and hot volume 31 are substantially consistent because there is very little hindrance to gas passage through heat-regenerative means 33.

Referring specifically to FIG. 7, the maximum amount of gas is contained in hot volume 31 at a higher pressure than both the external pressure to pressure responsive member 51 and the pressure in the exhaust reservoir which communicates with gas chamber 16 by means of exhaust conduit 20. Combustion product gas will pass from gas chamber 16 through exhaust conduit 20, valve 82 having been opened. The injection of fuel is stopped by the aforementioned means not shown. The pressure responsive member 51 is returned to the inward position by virtue of the opposing pressure thereto. This normally occurs upon the opening of valve 82 but may occur somewhat later as the pressure is lowered more. Displacer 30, as illustrated in FIG. 8 begins its counter-clockwise movement forcing the enclosed gas through heat-regenerative means 33. As the combustion product gas passes from hot volume 31 to cold volume 29 in heat-exchange relation with heat-regenerative means 33, the heating of heat-regenerative means 33 is accomplished. In FIG. 9, the continuing counter-clockwise movement of displacer 30 is shown causing a decrease in the temperature of the enclosed gas and a concomitant decrease in pressure of the enclosed gas. Valve 81 opens by mechanical control or by virtue of the decreased pressure, allowing air intake conduit 18 to admit combustion-supportable gas by virtue of the higher pressures in the reservoir external to air intake conduit 18. Movement of displacer 30 continues until the position shown in FIG. 3 is obtained and the cycle is continued in like fashion.

A slightly different cycle to the one just described is a cycle with "scavenging." A scavenger blower or its equivalent is mounted to the air intake conduit and during the latter part of the counter-clockwise displacer stroke forces air through cold volume 29 while exhaust conduit 20 is open. Exhaust valve 82 opens, in this cycle, during the latter part of the counter-clockwise displacer stroke when the pressure in the gas chamber 16 is only slightly greater than the pressure in exhaust conduit 20 and hence the exhaust "puff" is eliminated. The thermodynamic loss associated with this exhaust "puff" is hence also eliminated and this cycle furthermore provides a purer combustion-supportable gas to aid the succeeding combustion. The scavenging action may be arranged in a similar fashion as it is arranged in a regular 2-stroke gasoline engine.

These cycles of my internal combustion heat engine are not the only cycles which may be used. The cycle described was a 2-stroke cycle, having a counter-clockwise stroke and clockwise stroke. The clockwise stroke heated and therefore compressed the enclosed gas. The counter-clockwise stroke cooled and therefore caused the contraction of the enclosed gas. A 4-stroke cycle may replace the 2-stroke cycle described. This can be accomplished by letting the exhaust conduit be open during every other clockwise stroke while no fuel is being injected and no combustion taking place. The air intake conduit would be open during the succeeding counter-clockwise stroke when the remaining gas in the gas chamber is cooled by flowing through the heat-regenerative means. The succeeding clock-wise stroke becomes a combustion stroke during which the air intake and exhaust conduits are closed. During the following counter-clockwise stroke both conduits remain closed. The advantage of the four-stroke cycle just described is that it eliminates the exhaust "puff" and the consequent thermodynamic loss which occurs during the counter-clockwise stroke in one of the two-stroke cycles described.

Wide ranges of displacer frequencies are suitable for operation of the internal combustion heat engine of my invention. From about 30 to about 600 cycles per minute are well suited for operation of the invention. Preferred frequencies are from about 75 to 300 cycles per minute.

A wide variety of pressure responsive members may be positioned as a part of inner shell casing 15 in contact with the gas contained in gas chamber 16, permitting expansion of gas chamber 16. Any device which can respond to the pressure increase in a manner allowing utilization of the resultant mechanical energy is suitable. Two such devices are illustrated in FIG. 11 and FIGS. 12 and 13.

FIG. 11 shows one embodiment of a pressure responsive member for use as a pump operated by the internal combustion heat engine. Internal combustion heat engine 17 has a flexible membrane 38 as part of inner shell casing 15 and positioned between the gas contained in gas chamber 16 and a second fluid contained in chamber 42. Operation of engine 17 causes flexible membrane 38 to pulsate between the full line and dotted line position. Check valve 40 permits entry of fluid to chamber 42, while check valve 44 permits exit of fluid from chamber 42. Flexing of flexible membrane 38 toward the dotted line position increases the pressure in chamber 42 causing check valve 44 to open allowing the exit of fluid from chamber 42. Similarly, as membrane 38 flexes toward the full line position, the pressure in chamber 42 decreases causing check valve 40 to open and permit flow of fluid into chamber 42. Cycling of such steps produces a pumping action through chamber 42. The fluid in chamber 42 may be a liquid or a gas.

Another pressure responsive member arrangement is shown in FIG. 12. A piston 62 serves as pressure responsive member. Attached thereto is piston rod 63 connected to compressor piston 64, working in a compressor cylinder 65. Piston rod 63 is sealed to cylinder housing 65 by a seal 71. To achieve a proper force balance the right side of piston 64, as shown in FIG. 12, is exposed to the pressure of the gas to be compressed by means of a conduit 66, which is in communication with the inlet conduit 67. When pistons 62 and 64 reciprocate due to the varying pressure in chamber 16, fluid will enter from inlet conduit 67 via check valve 69 into cylinder chamber 99 where it, during the subsequent reverse piston stroke, will be compressed and exhausted through check valve 70 into high pressure conduit 68. A proper choice of cross sectional area of piston rod 63 will insure that the pistons 62 and 64 will return to their innermost position with respect to chamber 16 when the pressure in 16 is about atmospheric, provided that the pressure in conduits 67 and 68 are above atmospheric. FIG. 12 shows a cooling mechanism comprising condenser means, expansion means, evaporation means, compression means and contained refrigerant wherein said compression means is actuated by movement of said pressure responsive member. The compressor piston 64 and compressor cylinder 65 show the compression means of the cooling mechanism shown in FIG. 12.

According to this invention, a refrigeration system is provided whereby an internal combustion heat engine may be used to actuate a compression means of the refrigeration system comprised of a condenser means, expansion means, evaporation means, compression means and a contained refrigerant. The working gas in gas chamber 16 is isolated from any other gas or fluid which utilizes work output of the invention. Therefore, it is possible to utilize a second gas, having optimal properties as a refrigerant in a cooling system driven by work output from the internal combustion heat engine. The refrigerant may be a fluid which possesses the most desirable physical properties for such use.

Another pressure responsive member is illustrated by FIG. 13. FIG. 13 is a schematic cross section of a piston device having housing 73, attached to outer shell casing 19 and inner shell casing 15 of internal combustion heat engine 17, and piston 72 adapted for reciprocating motion within housing 73. Piston 72 is sealed by means of piston rings or its equivalent. Also, positive seals like bellows or diaphragms may be used. Attached to piston 62 is connecting rod 74 which may serve to transmit mechanical energy in a variety of ways. For example, connecting rod 74 may turn a wheel. Any person skilled in the art and familiar with this invention will readily recognize many methods for harnessing the energy produced by the internal combustion heat engine and process of this invention.

Internal combustion heat engine 17 may be made of a wide variety of materials. Of prime importance are strength, conduction, temperature and temperature change resistant properties of materials used. Displacer and inner shell casing, as already mentioned, should be made of low conductivity materials. Examples of materials suitable for outer shell casing and shaft are stainless steel and various stainless steel alloys. Wide varieties of insulation common in the art may be used. Many types of valves that are common in the art may be used in the device of my invention. Valves of the type commonly used on automobile engines are suitable.

Pressure responsive members must be able to withstand the temperature and temperature variations of the internal combustion heat engine of this invention. The pressure responsive member may be exposed to either the hot or the cold volumes. There are advantages to each. A pressure responsive member exposed only to the gas in the cold volume of the internal combustion heat engine of this invention will not be required to withstand the extreme temperatures. This is particularly beneficial if a flexible membrane as shown in FIG. 11 is used. Rubber and various synthetic materials such as certain plastics are suitable for use as a flexible membrane. The advantage of placing the pressure responsive member in contact with the hot volume gas arises because the displacement volume of the pressure responsive member is positioned on the hot volume side will be greater for given temperature and pressure ratios.

Metal pressure responsive members thermally protected by an insulation are highly preferred when contact is with the hot volume. Metal membranes made of copper, nickel, various stainless steel alloys or mixtures of copper and nickel, as well as other flexible materials, are available. Hard pressure responsive members such as the pistons of FIGS. 12 and 13 may be made of stainless steel or stainless steel alloys or other similar materials. Piston rings may serve as seals. Seals must be constructed of suitable material and of suitable design to permit the required flexing and expansion of the pressure responsive member while at the same time being sufficiently gastight. With air as the working fluid in the engine, a certain small leakage can be tolerated, without significant harmful influence.

The fluid fuel used in the internal combustion heat engine of my invention may be either a gas or a liquid. Any fluid which will burn at temperatures suitable for practical use and providing sufficient pressure gradients is suitable. The liquid or gaseous hydrocarbons, whether synthetic or fossil fuels, are preferred. Natural gas, methane, ethane, propane and butane are preferred since they burn cleanly. Natural gas is most preferred. Hydrogen is a suitable fluid fuel. Oil and gasoline, as well as other liquid fuels, may also be used. When a liquid fluid fuel is used, carburetion means 83 may be used to atomize the fuel for the most desirable combustion. Carburetion means 83 is not required, particularly when a gas fluid fuel is used.

The heat-regenerative means of this invention has been found to be very efficient in takeup, storage and release of heat energy. Efficiencies over 90 percent are common. Therefore, the temperature difference between hot volume 31 and cold volume 29 may be substantial. I have found that typical temperatures for the hot and cold volumes are approximately 2,000° F. and 250° F. Operable ranges for the hot and cold volumes are difficult to state since the engine will work with any substantial temperature difference and over wide ranges. Typically, the cold volume temperature will be in the range of from about 100° to 250° F. while the hot volume temperature will be in the range from about 1,000° to 2,500° F.

The external shell of the internal combustion heat engine of my invention may be air cooled or water cooled in a wide variety of methods. Cooling methods common in the prior art are suitable for this invention.

Any combustion-supportable gas could be used in gas chamber 16 of the internal combustion heat engine of my invention. Although air is preferred, enriched oxygen gases may also be used. The combustion-supportable gas will enter the gas chamber through air intake conduit 18. Air intake conduit 18 will normally allow access to cold volume 29 of gas chamber 16. However, its location is not necessarily determined with reference to the location of exhaust conduit 20. If a scavenger blower or its equivalent is used, it is preferred that air intake conduit 18 and exhaust conduit 20 be located such that a cross draft is provided. Fuel injection means provide injection of a combustible fluid fuel into hot volume 31. The fuel injection means may be mounted on the heat-regenerative means or in the shell casing as indicated.

FIG. 10 shows the thermodynamic curves for a refrigeration system according to this invention. Different absolute pressures may be used in the power cycle and the cooling cycle, for example, by means of the piston arrangement shown in FIG. 12. The power cycle is shown wherein postion A corresponds with the physical configuration shown in FIG. 3. The increase in temperature at constant volume between points A and B is illustrated by the configuration shown in FIG. 4. Further heating at constant pressure from point B to C is shown by the configurations in FIGS. 5 and 6, and the midpoint of the power cycle shown at point C corresponds to the physical configuration shown in FIG. 7. Cooling at constant volume between points C and D corresponds to the configuration shown in FIG. 8. Further cooling at constant pressure between points D and A is illustrated by the configuration in FIG. 9. The cooling cycle illustrates a standard Freon cooling cycle.

The overall coefficient of performance of from about 1.0 to 1.3 can be achieved using the cooling system of this invention. These coefficients of performance have been calculated using natural gas as the combustible fluid fuel heat source for the power cycle and Freon as the refrigerant, and represent the overall efficiency from the natural fuel to the cooling output.

Many other uses may be made of the internal combustion heat engine of my invention. A cooling system is but one. The internal combustion heat engine of my invention may be used as a prime mover in a wide variety of applications. In addition to use as a pump or compressor, the internal combustion heat engine of my invention may be adapted for use in transportation machinery and other types of machinery.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for conversion of chemical energy to mechanical energy comprising:
    passing combustion-supportable gas into a substantially gastight gas chamber,
    heating said gas by passage in heat-exchange relation with a heat-regenerative means,
    injecting a combustible fluid fuel into said gas chamber for contact with said heated combustion-supportable gas during said heating,
    substantially continuous burning of said fuel in contact with said heated combustion-supportable gas during said injecting thereby forming combustion product gas,
    expanding said gas chamber by movement of a pressure responsive member,
    heating said heat-regenerative means by passage of said combustion product gas in heat-exchange relation with said heat-regenerative means, and
    passing said combustion product gas from said gas chamber.

2. The process of claim 1 wherein said combustible fluid fuel is selected from a class consisting of the liquid or gaseous hydrocarbons.

3. The process of claim 1 wherein said combustible fluid fuel is selected from the class consisting of methane, ethane, propane and butane.

4. The process of claim 1 wherein said combustible fluid fuel is natural gas.

5. The process of claim 1 wherein said combustible fluid fuel is in a gaseous form.

6. The process of claim 1 wherein said combustible fluid fuel is in a liquid form.

7. An internal combustion heat engine comprising a casing defining a generally cylindrical gas chamber for confining gas, a heat-regenerative means within said gas chamber extending from said casing toward the center of said chamber and extending substantially the length of said chamber, an oscillating displacer dividing said chamber into a first and second volume and by oscillatory movement displacing said gas from said first volume through said heat-regenerative means into said second volume at a higher average temperature-pressure relationship, and from second volume through said heat-regenerative means into said first volume at a lower average temperature-pressure relationship, an air intake conduit for passage of a combustion-supportable gas into said first volume, an exhaust conduit for passage of combustion product gas from said first volume, fuel injection means for injection of a combustible fluid fuel into said second volume, an ignition means, and a pressure responsive member in said casing permitting expansion and contraction of said gas chamber.

8. The internal combustion engine of claim 7 wherein said combustible fluid fuel is selected from a class consisting of the liquid or gaseous hydrocarbons.

9. The internal combustion heat engine of claim 7 wherein said pressure responsive member comprises a flexible membrane.

10. The internal combustion heat engine of claim 7 wherein said pressure responsive member comprises a piston.

11. The internal combustion engine of claim 7 wherein said displacer oscillates at from about 30 to 600 cycles per minute.

12. The internal combustion heat engine of claim 7 wherein said displacer oscillates at from about 75 to 300 cycles per minute.

13. A cooling apparatus comprising an internal combustion heat engine comprising a casing defining a generally cylindrical gas chamber for confining gas, a heat-regenerative means within said gas chamber extending from said casing toward the center of said chamber and extending substantially the length of said chamber, an oscillating displacer dividing said chamber into a first and second volume and by oscillatory movement displacing said gas from said first volume through said heat-regenerative means into said second volume at a higher average temperature-pressure relationship, and from second volume through said heat-regenerative means into said first volume at a lower average temperature-pressure relationship, an air intake conduit for passage of a combustion-supportable gas into said first volume, an exhaust conduit for passage of combustion product gas from said first volume, fuel injection means for injection of a combustible fluid fuel into said second volume, an ignition means, and a pressure responsive member in said casing permitting expansion and contraction of said gas chamber, in combination with a cooling mechanism comprising condenser means, expansion means, evaporation means, compression means and contained refrigerant wherein said compression means is actuated by movement of said pressure responsive member.

14. The cooling apparatus of claim 13 wherein said combustible fluid fuel is selected from the class consisting of the liquid or gaseous hydrocarbons.

15. The cooling apparatus of claim 13 wherein said pressure responsive member comprises a flexible membrane.

16. The cooling apparatus of claim 13 wherein said pressure responsive member comprises a piston.

17. The cooling apparatus of claim 13 wherein said displacer oscillates at from about 30 to 600 cycles per minute.

18. The cooling apparatus of claim 13 wherein said displacer oscillates at from about 75 to 300 cycles per minute.

* * * * *